United States Patent
Adams (10) Patent No.: US 8,312,674 B2
(45) Date of Patent: Nov. 20, 2012

(54) STACKABLE PLANTER

(75) Inventor: William E. Adams, Portersville, PA (US)

(73) Assignee: Adams Mfg. Corp., Portersville, PA (US)

( * ) Notice: Subject to any disclaimer, the term of this patent is extended or adjusted under 35 U.S.C. 154(b) by 454 days.

(21) Appl. No.: 12/765,143

(22) Filed: Apr. 22, 2010

(65) Prior Publication Data

US 2011/0258928 A1    Oct. 27, 2011

(51) Int. Cl.
*A01G 27/06* (2006.01)

(52) U.S. Cl. .............................................. 47/79; 47/66.7

(58) Field of Classification Search ............... 47/65.5, 47/66.1, 66.4, 66.6, 66.7, 67, 79, 85
See application file for complete search history.

(56) References Cited

U.S. PATENT DOCUMENTS

| | | | |
|---|---|---|---|
| 2,896,809 A * | 7/1959 | Metzger et al. ............... 220/553 |
| 3,676,953 A | 7/1972 | Delogne | |
| 3,993,192 A * | 11/1976 | Bunn ............................. 206/515 |
| 4,173,097 A * | 11/1979 | Staby ............................. 47/65.5 |
| 4,446,652 A * | 5/1984 | Anderson ......................... 47/79 |
| 4,538,378 A | 9/1985 | Roige | |
| 4,813,177 A * | 3/1989 | Brilliande ..................... 47/66.4 |
| 4,955,503 A * | 9/1990 | Propes .......................... 220/526 |
| D313,203 S | 12/1990 | Carlson | |
| 5,806,242 A | 9/1998 | Park | |
| D422,936 S | 4/2000 | Tsou | |
| 6,062,389 A * | 5/2000 | Kent ............................. 206/518 |
| 6,079,586 A * | 6/2000 | Hanneman ..................... 220/526 |
| 6,226,921 B1 | 5/2001 | Kang | |
| 6,357,179 B1 | 3/2002 | Buss | |
| 6,584,730 B1 | 7/2003 | Mai | |
| 6,783,023 B1 | 8/2004 | Fan | |
| D546,012 S * | 7/2007 | Casteel et al. ................. D32/53 |
| 7,340,859 B2 | 3/2008 | Palsrok | |
| 2006/0112634 A1 | 6/2006 | Vogt | |
| 2009/0277085 A1 | 11/2009 | Stewart | |
| 2011/0258928 A1* | 10/2011 | Adams ............................. 47/79 |

FOREIGN PATENT DOCUMENTS

FR    2602639 A1    2/1988

* cited by examiner

*Primary Examiner* — Frank T Palo (74) *Attorney, Agent, or Firm* — Buchanan Ingersoll & Rooney PC (57) ABSTRACT

A stackable planter has a generally rectangular base having a base area. A hollow leg is attached to opposite sides of the base. Each leg has an open top, the open top of each leg being adjacent opposite sides of the base. The area of the open top is less than the base area. Interconnected sidewalls extend from the base and the legs to define a cavity for planting soil. A removable cover fits over the open area of each leg. These covers also fit on the rectangular base. The base, covers and open tops of the legs are sized such that the covers may be placed on the base and not extend into the open area of the legs and each cover can be placed over the open area of a leg fully covering the open area. The sidewalls and the legs are sized and configured so that one planter body can be positioned within another planter for storage and shipment.

11 Claims, 9 Drawing Sheets

STACKABLE PLANTER

FIELD OF INVENTION

The invention relates to planters for flowers and other plants.

BACKGROUND OF THE INVENTION

There are a variety of planters available in the marketplace for flowers and other plants. All planters have a body which defines a cavity in which potting soil is held. Most planters in the market are molded plastic. Others are made from materials such as fiber, porcelain, clay, foam, and metal.

Some planters known in the art have a first container in which planting soil is held and a tray or second container in which the first container is placed such that water may be held in the tray or second container. The tray or second container acts as a reservoir or water supply for the potting soil in the first container. Examples of such planters may be found in U.S. Pat. Nos. Des 422,936 and 6,783,023 to Fan, 5,806,242 to Park and 6,584,730 to Mai. U.S. Pat. No. 6,357,179 discloses a self-watering planter in which a floor fits into the planter body defining a lower chamber that is filled with water and an upper chamber that hold potting soil.

Retailers have limited space in which to display products being offered for sale. Consequently, there is a preference for products that can be stacked or nested thereby providing more units in a given volume. The unit cost to ship and store products which are nested together is significantly less that the storage and shipping costs of products which cannot be nested. It is preferable that the planters can be tightly packed and condensed for transport.

While the art has developed a variety of stackable planters, such as are disclosed in U.S. Pat. Nos. 5,806,242 and Des 422,936, those planters which have a water reservoir either are not stackable or cannot be densely stacked. Thus, there is a need for a stackable planter which has a water reservoir and is configured so that multiple planters can be tightly stacked.

SUMMARY OF THE INVENTION

I provide a stackable planter which has a generally rectangular base having a length, a width and a base area which is the length times the width. A hollow leg is attached to opposite sides of the base. Each leg has an open top, the open top of each leg being adjacent opposite sides of the base. The area of the open top is less than the base area. Interconnected sidewalls extend from the base and the legs to define a cavity for planting soil. A removable cover fits over the open area of each leg. These covers also fit on the rectangular base. The base, covers and open tops of the legs are sized such that the covers may be placed on the base and not extend into the open area of the legs and each cover can be placed over the open area of a leg fully covering the open area.

The sidewalls and the legs are sized and configured so that one planter body can be positioned within another planter. Because of the shape of the planter body and the dimensions of the legs multiple planters can be nested together and tightly stacked.

The legs can be filled with water and a wick may extend from each leg into the planter body.

Other objects and advantages of the present invention will become apparent from a description of certain present preferred embodiments thereof show in the drawings.

DESCRIPTION OF THE PREFERRED EMBODIMENTS

A present preferred embodiment of my planter 1 is shown in FIGS. 1 through 5. I provide a planter body 2 having a base 4, legs 6 and sidewalls 7. The sidewalls extend from the base and the legs to define a cavity 3 in which potting soil is placed. The sidewalls are preferably sloped. A peripheral lip 9 extends outward from the sidewalls.

Each leg has an open top 8. A removable cover 10 is provided over each leg. Cover supports 14 are provided within the legs 6. These covers 10 also fit on the rectangular base 4. The base, covers and open tops of the legs are sized such that the covers may be placed on the base and not extend into the open area of the legs and can be placed over the open area fully covering the open area.

A wick 12 extends through an opening 11 in each cover to the bottom of the leg. The wick draws water from the leg into planting soil (not shown) that is put in the planter. In this way the legs act as a water reservoir. I prefer to provide a fill spout 17 on each leg. The fill spout is preferably made with a thin wall that will flex inward when the planter is nested within a second planter.

I prefer to configure each leg so that the base of each leg has a curved portion 20 on either side of two flat portions giving the appearance of four legs rather than two legs.

Figure 1:
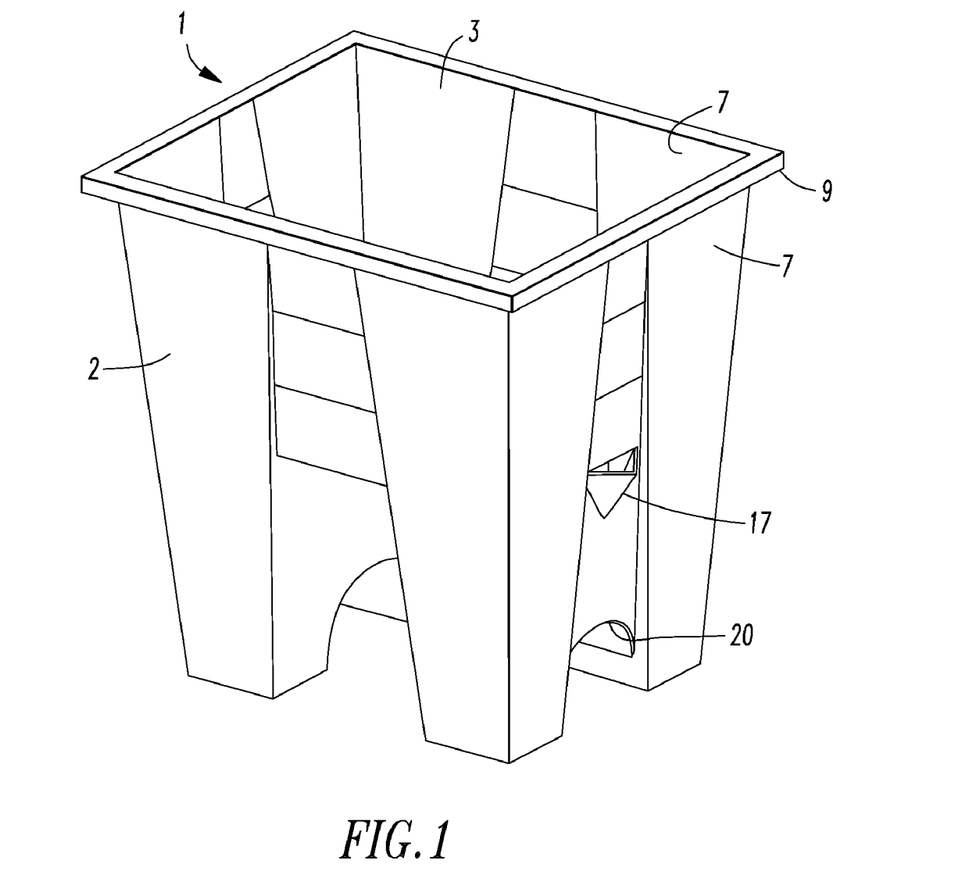
FIG. 1 is a perspective view of present preferred embodiment of my planter.
Figure 2:
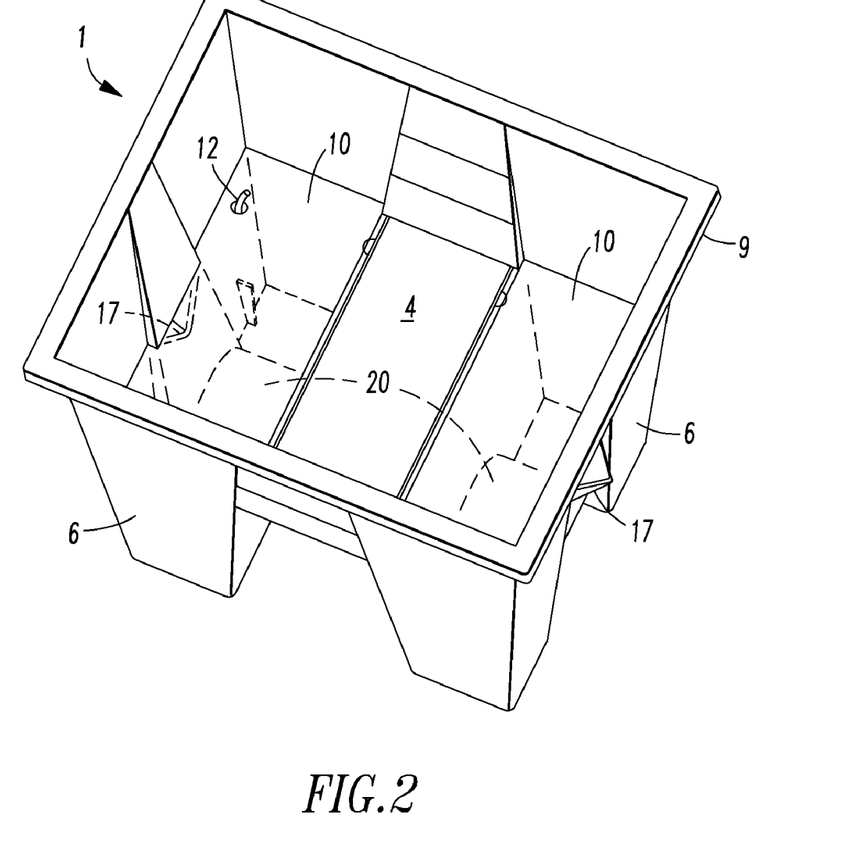
FIG. 2 is a second perspective view of the planter shown in FIG. 1.
Figure 3:
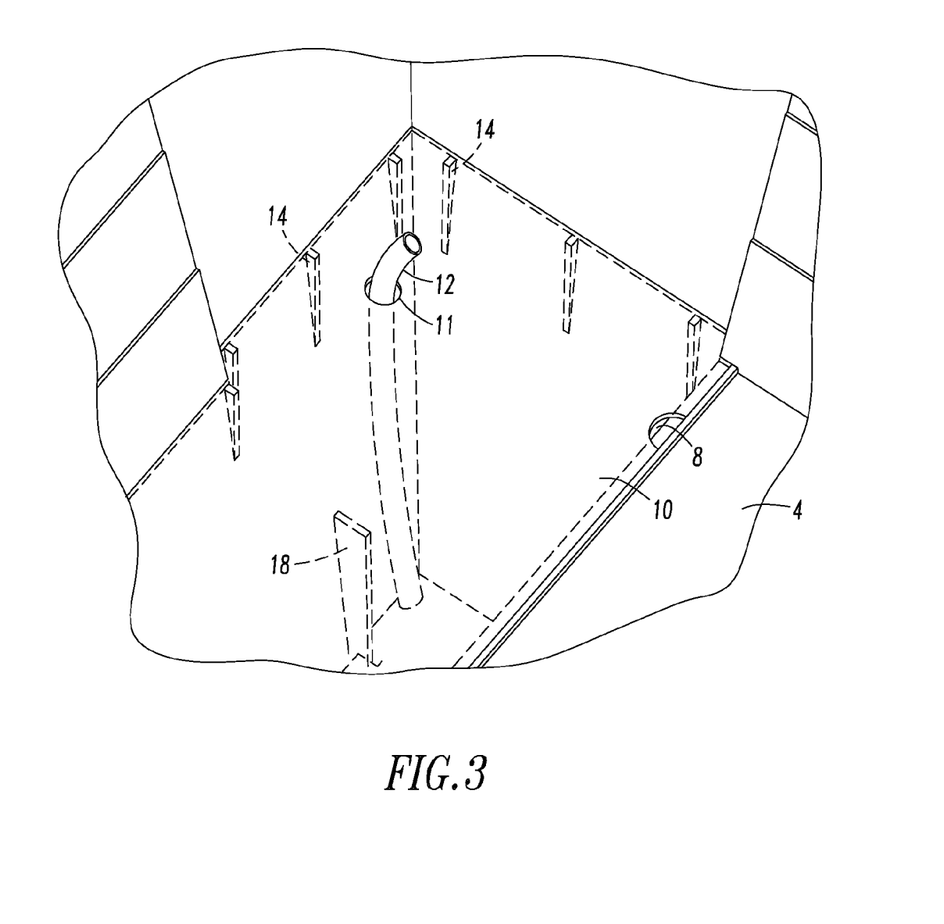
FIG. 3 is a fragmentary view showing a portion of the inside of the planter shown in FIGS. 1 and 2.
Figure 4:
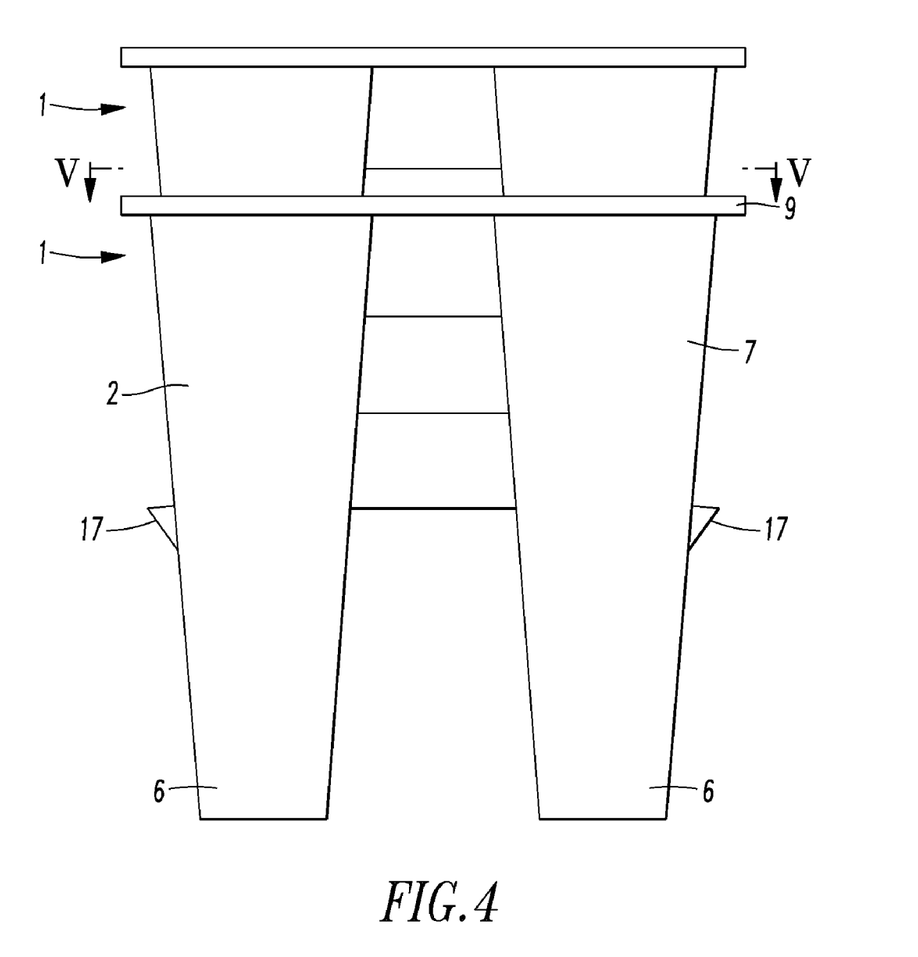
FIG. 4 is a side view of two planters of the type shown in FIGS. 1 and 2 stacked for storage and shipment.
Figure 5:
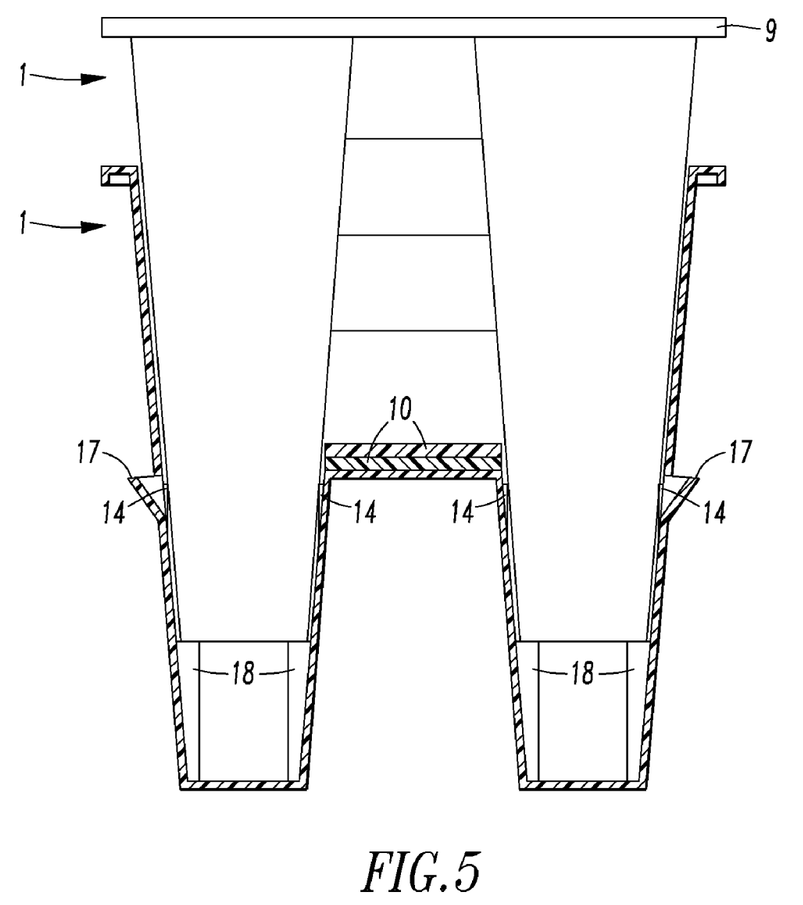
FIG. 5 is a side view similar to FIG. 4 with the lower planter shown in a sectional view taken along the line V-V in FIG. 4.

The planter is sized so that multiple planters may be stacked and nested as shown in FIGS. 4 and 5. When so stacked and nested the legs 14 of the upper planter fit within the legs of a second similar planter while the covers 10 are on the base 4. I prefer to provide at least one stacking rib 18 within each leg to maintain a desired spacing and even stacking of planters. Consequently several of these planters when stacked and nested together form a very dense stack for storage and shipment.

Figure 6:
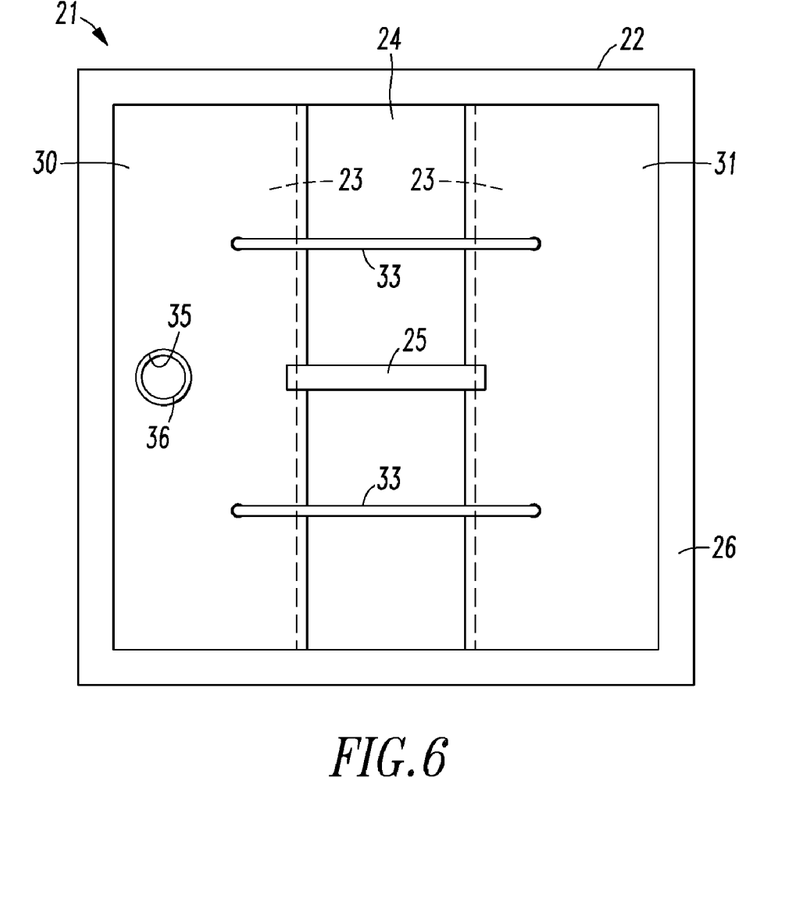
FIG. 6 is a top view of a second present preferred embodiment of my planter.

A second present referred embodiment of my planter shown in FIG. 6 is similar to the embodiment shown in FIGS. 1 through 5. But in this embodiment there is a fill tube rather than a fill spout and the water can flow between the cavities defined by the legs. The second embodiment of my planter 21 has a body 22 similar to the body 2 of the first embodiment. Legs 26 are separated by a base 24 and have a cavity 23 which holds water. In this embodiment a tub 25 or channel is formed in the base 24 and runs between the cavities 23 in each leg. Covers 30 and 31 are sized to fit over the cavities and on the base for storage as in the first embodiment. Both covers have openings 32 into which water wicking material 33 is inserted. I prefer to provide two ropes of water wicking material which extend from the bottom of one leg through the first cover 30, across the base 24, through the second cover 31 to the bottom of the other leg. Cover 30 has a fill tube hole 35 which receives the fill tube 36. Water is poured through the fill tube into the leg cavity below cover 30. When the water reaches the level of tube or channel 25, additional amounts of water poured into the fill tube will flow into the leg cavity below cover 31. When both cavities are full water will rise in the fill tube indicating that the planter is filled. I prefer to make the fill tube of flexible material so that the tube can be stored in a leg cavity. A friction fit is provided between the fill tube 36 and cover 30.

Figure 7:
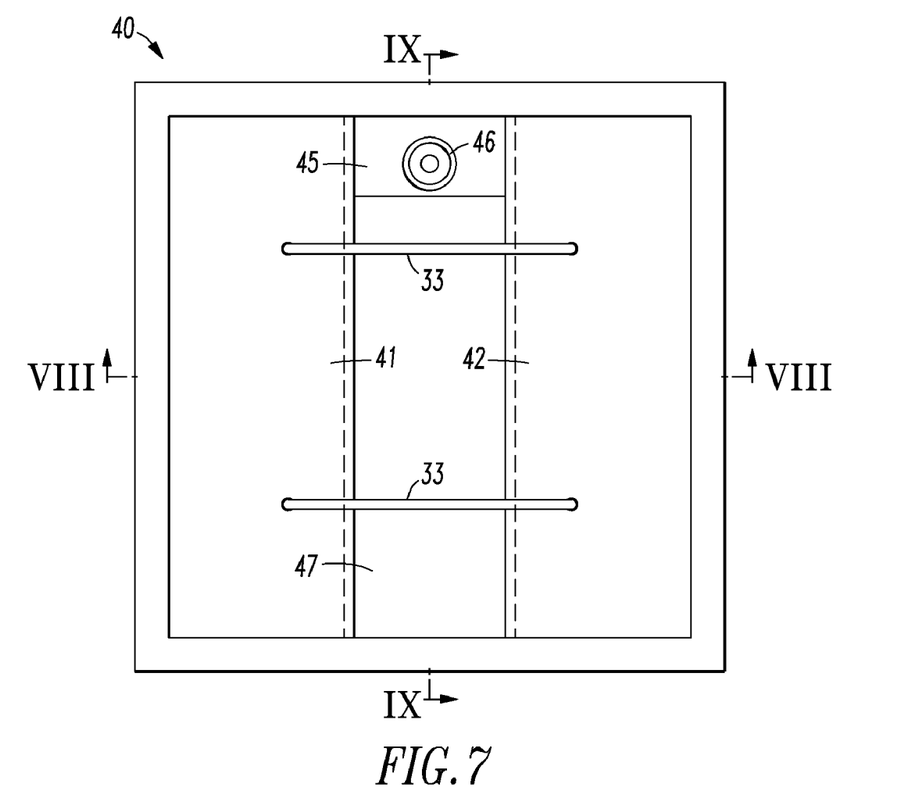
FIG. 7 is a top view of a third present preferred embodiment of my planter.
Figure 8:
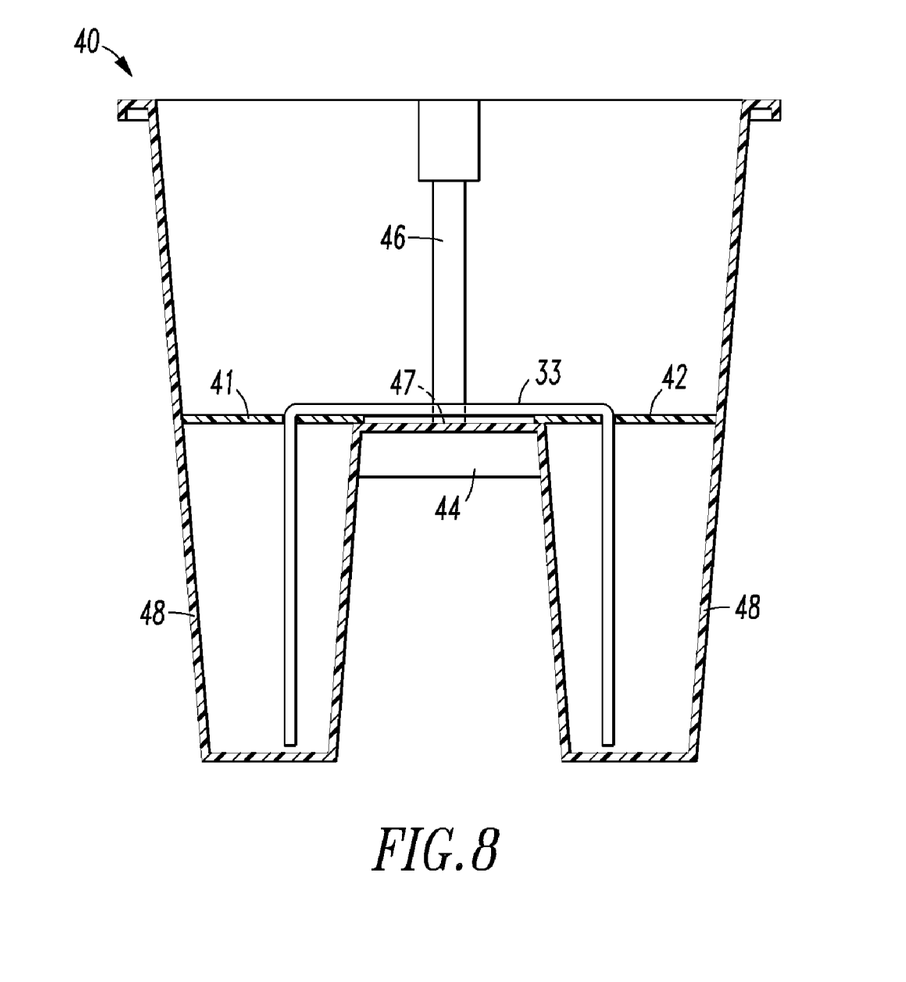
FIG. 8 is a sectional view taken along the line VIII-VIII in FIG. 7.
Figure 9:
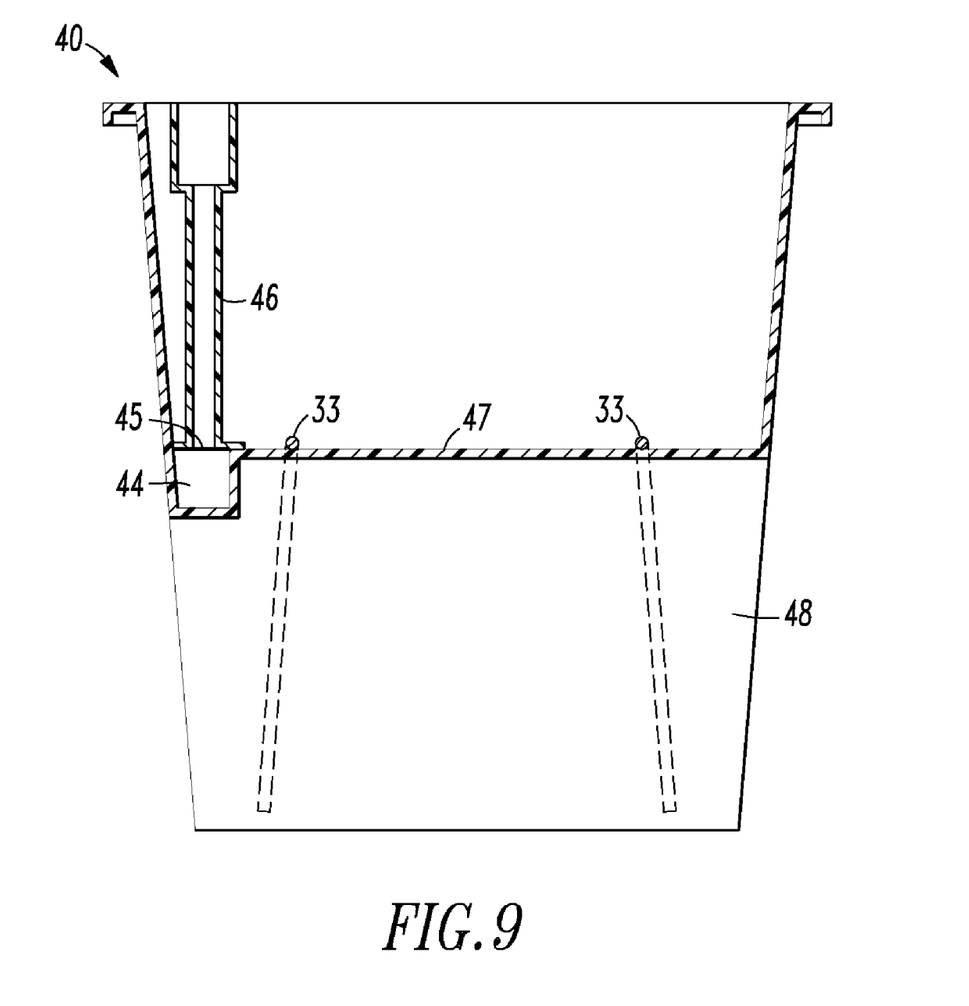
FIG. 9 is a sectional view taken along the line IX-IX in FIG. 7.

A third present preferred embodiment of my planter 40 is shown in FIGS. 7, 8 and 9. This planter is similar to the second embodiment having wicking material 33 which extends between the legs 48 and passes through covers 41 and 42. In this embodiment I provide a channel 44 in the base 47 that extends between the legs 46. A cover 43 with opening 45 fits over the channel 44. A fill tube 46 fits into opening 45 and extends upward to the top of the planter. When the planter is assembled as in FIGS. 7 and 8, water poured into the fill tube will pass through the channel 44 into the legs 46. The fill tube 46 and wicking material 33 are flexible and can be placed in the bottom of either leg for storage. As in the first embodiment covers 41 and 42 fit over the base 47 for storage. Consequently, this embodiment can be stacked in the same manner as the first embodiment as shown in FIGS. 4 and 5.

The planters shown in the drawings and described herein can be of any desired size. However, I prefer that the planter be 15.5 inches (39.4 centimeters) wide, 19.5 inches (49.5 centimeters) long and 15 inches (38.1 centimeters) high. The ropes of the wicking material should be about 28 inches (71.1 centimeters) long for a planter of this size.

Depending upon the size of the legs, the planter may hold several gallons of water in the legs. Consequently, plants grown in this planter could thrive for several days or even weeks without watering or refilling the legs with water.

The planter body and covers are preferably made from injection molded plastics such as polycarbonate or polyvinylchloride. For ease of molding I prefer that the side walls be tapered, as can be seen in FIG. 4, rather than be perpendicular to the base.

Although I have described and illustrated certain present preferred embodiments of my elevated planter box it should be distinctly understood that the invention is not limited to but may be variously embodied within the scope of the following claims:

1. A stackable planter comprising:
a planter body comprised of:
a generally rectangular base having a length, a width and a base area which is the length times the width;
a pair of hollow legs attached to opposite sides of the base, each leg having:
an open top, the open top of each leg being adjacent opposite sides of the base, the open top of each leg having an open area which is less that the base area, and
at least one cover support adjacent the open area;
interconnected sidewalls extending from the base and the legs to define a cavity for planting soil; and
a pair of removable covers within the cavity, each cover having an area not larger than the base area and not less than the open area of the legs, such that the covers may be placed on the base and not extend into the open area of the legs and can be placed on the at least one cover support and over the open area of a leg fully covering the open area;
wherein the sidewalls and the legs are sized and configured so that the planter body can be positioned within a second planter having a same body with a pair of legs and a pair of removable covers positioned on the base such that the pair of legs extend into the pair of legs of the second planter.

2. The planter of claim 1 also comprising a stacking rib within each leg.

3. The planter of claim 1 wherein the planter body and the legs are plastic.

4. The planter of claim 1 also comprising a lip extending from the interconnected sidewalls.

5. The planter of claim 1 wherein the sidewalls are tapered.

6. The planter of claim 1 wherein each leg has a bottom comprised of a curved portion between to flat portions.

7. The planter of claim 1 also comprising a fill spout on at least one leg.

8. The planter of claim 1 wherein a channel is provided on the base, the channel extending between the hollow legs.

9. The planter of claim 1 also comprising a cover over the channel.

10. The planter of claim 9 wherein the cover has a fill tube opening and further comprising a fill tube connected to the fill tube opening and extending away from the cover.

11. The planter of claim 1 wherein at least one cover of the pair of removable covers has a fill tube opening and further comprising a fill tube connected to the fill tube opening.

* * * * *